United States Patent [19]
Lin

[11] Patent Number: 6,043,967
[45] Date of Patent: Mar. 28, 2000

[54] EARLY TRIGGER OF ESD PROTECTION DEVICE BY A VOLTAGE PUMP CIRCUIT

[75] Inventor: Shi-Tron Lin, Hsinchu, Taiwan

[73] Assignee: Winbond Electronics Corp., Taiwan

[21] Appl. No.: 08/956,270

[22] Filed: Oct. 22, 1997

[51] Int. Cl.[7] .................................................. H02H 3/22
[52] U.S. Cl. ............................................. 361/111; 361/56
[58] Field of Search ................................ 361/56, 91, 111, 361/212, 220; 327/310–314, 318–321; 257/355–358

[56] References Cited

U.S. PATENT DOCUMENTS

| | | | |
|---|---|---|---|
| 4,503,448 | 3/1985 | Miyasaka | 357/23 |
| 5,218,222 | 6/1993 | Roberts | 257/362 |
| 5,272,371 | 12/1993 | Bishop et al. | 257/362 |
| 5,290,724 | 3/1994 | Leach | 437/51 |
| 5,352,936 | 10/1994 | Allen | 307/304 |
| 5,399,928 | 3/1995 | Lin et al. | 327/434 |
| 5,508,224 | 4/1996 | Jang | 437/60 |
| 5,545,910 | 8/1996 | Jang | 257/362 |
| 5,625,544 | 4/1997 | Kowshik et al. | 363/59 |

OTHER PUBLICATIONS

A. Amerasekera, et al., Substrate Triggering and Salicide Effects on ESD Performance and Protection Circuit Design in Deep Submicron CMOS Processes, IEDM–95, pp. 547–550.
A. Amerasekera, et al., ESD in Silicon Integrated Circuits, John Wiley & Sons, pp. 40–48 and 68–72, 1995.

Primary Examiner—Jeffrey Gaffin
Assistant Examiner—Michael J. Sherry
Attorney, Agent, or Firm—Proskauer Rose LLP

[57] ABSTRACT

A transient voltage pump is provided to generate a high voltage pulse for triggering turn-on of an ESD protection device. As VDD-to-VSS voltage increases rapidly in the initial ESD event, the voltages of the high voltage pulses are larger than the trigger voltage of the ESD device while the ESD voltage is still at substantially lower voltage. These high voltage pulses are used to early trigger the NMOS transistor before the ESD transient voltage actually reaches the trigger voltage. The present invention improves the ESD performance of an ESD protection device, such as a MOSFET or bipolar transistor, which is provided for protecting the power bus or IC pins during an ESD event.

38 Claims, 4 Drawing Sheets

EARLY TRIGGER OF ESD PROTECTION DEVICE BY A VOLTAGE PUMP CIRCUIT

FIELD OF INVENTION

The present invention relates to an ESD protection circuit on a semiconductor device.

BACKGROUND OF THE INVENTION

In order to protect the integrated circuit from damages possibly caused by an electrostatic discharge (ESD) event, different efforts have been made by the industries. Transistors, such as grounded-gate NMOS (GGNMOS), gate-coupled NMOS (GCNMOS), field-oxide MOSFET, output buffer transistors, or bipolar transistors, have been commonly used as primary ESD protection elements for integrated circuits. A diode also can be used as an ESD protection device by avalanche breakdown during an ESD event.

For ESD protection of an IC pin or a power bus, GGNMOS (grounded-gate NMOS) or GCNMOS (gate-coupled NMOS) can be used as the primary ESD protection. The drain of the NMOS transistor is connected to VDD or the IC pin, while the source of the NMOS transistor is connected to VSS. The gate is either grounded (GGNMOS), or coupled to VDD by a capacitor and to VSS by a resistor (GCNMOS). A bipolar transistor or other ESD protection circuit can also be used for ESD protection. The VDD to VSS voltage difference may increase rapidly to higher than 10 volts during an ESD event such as the following situations: (i) positive voltage stress of VDD pin to VSS pin, (ii) negative voltage stress of VSS pin to VDD pin, (iii) positive voltage stress on an input or I/O pin while the pin is connected to a pull-up (p+/nwell) diode or a pull-up PMOS, (iv) negative voltage stress on an input or I/O pin while the pin is connected a pull-down (n+/pwell) diode or a pull-down NMOS, or (v) positive voltage stress applied across one IC pin and another IC pin.

The ESD protection of a MOSFET (bipolar transistor as well) heavily depends on the triggering of a snap-back mechanism for conducting large amount of ESD current between the drain and source of MOSFET. To start, the high electric field at the drain-substrate junction causes impact ionization with generation of both minority and majority carriers. The minority carriers is collected at the drain (anode), while the majority carriers flow toward the substrate or pwell contact (cathode) causing a local potential build up in the pwell. When the local substrate potential is 0.8 V higher than the adjacent n+ source potential, the source-substrate junction becomes forward biased. The forward-biased source-substrate junction injects minority carriers into the pwell. Some of those injected minority carriers are recombined in the substrate while the rest of them reached the drain-substrate junction to further enhance the impact ionization. And due to a continuous loop (positive feedback), the MOSFET gets into a low impedance (snapback) state to conduct large amount of ESD current.

In an ESD event, the triggering of an NMOSFET or bipolar ESD protection device is typically initiated by the avalanche breakdown of the reverse-biased diffusion-substrate junction (drain-substrate or collector-substrate junction). The trigger voltage is typically around 12 or 13 volt. It is of great advantage to lower the trigger voltage of a MOSFET (or bipolar transistor) during an ESD event. As the ESD protection occurs sooner, the transient voltage imposed on the I/O and internal circuit is lower which offers better overall ESD protection. When minority carriers (electrons) are present in the reverse-biased diffusion-substrate junction, due to carrier multiplication from impact ionization, the trigger voltage is reduced and the integrated circuit can be better protected in an ESD event.

The prior art, "ESD in Silicon Integrated Circuits" by A. Amerasekera and C. Duvvury, Chap. 3 and Chap. 4, John Wiley & Sons, 1995, hereinafter Ref. 1, describes in details the mechanism of ESD protection circuit. Among prior arts approaches, U.S. Pat. No. 5,366,908 discloses a process for fabricating a MOS device with protection against ESD. The Ref. 1 and U.S. Pat. No. 5,272,371 use a trigger device with a lower trigger voltage than that of the ESD protection device. Once the trigger device reaches avalanche breakdown, lots of carriers are generated and some of them flow in the substrate to induce the trigger of the ESD protection device. Usually, additional implant or a special process recipe is needed, as disclosed in the U.S. Pat. No. 5,272,371, to adjust the trigger voltage of the trigger device, such that it is lower than the trigger voltage of the ESD protection device. The U.S. Pat. No. 5,218,222 discloses another ESD protection circuit applicable for output and input pads. The U.S. Pat. No. 5,290,724 discloses another process for forming an ESD protection circuit. The U.S. Pat. No. 5,508,224 discloses another process for forming an ESD protection circuit. The U.S. Pat. No. 5,545,910 discloses another ESD protection circuit. Prior art reference "Substrate Triggering and Salicide Effects on ESD Performance and protection Circuit Design in Deep Submicron CMOS Processes" presented by Amerasekera et al. in 1995 IEDM conference paper, lowers the trigger voltage of an ESD protection device by forward biasing a pull-up diode (p+/n-well diode) connected between the input pad and VDD bus. Through the reverse-biased nwell-to-pwell junction, some carriers are collected into the pwell to help trigger the ESD protection device in the pwell. Usually, a method of this nature creates a parasitic SCR (pnpn) path with a reverse-biased nwell/pwell junction, and the latch-up immunity issue therewith needs special design considerations.

U.S. Pat. No. 5,399,928 describes a method of generating negative voltage from a positive voltage source. The negative voltages are typically generated during IC operation and is used for back-bias generator or for the erase operation of Flash memory cells. U.S. Pat. No. 5,625,544 describes a voltage pump which generates a train of high voltage pulse with voltage values higher than Vdd during circuit operation. The pumped high voltage is used for EPROM erasing. U.S. Pat. No. 5,352,936 discloses a technique by which a high voltage charge pump is constructed by low voltage CMOS devices. It is well known, from U.S. Pat. Nos. 5,290,724 and 5,345,357, that an integrated circuit and a corresponding ESD protection structure may be built on a substrate.

SUMMARY OF THE INVENTION

The present invention relates to reduction of the trigger voltage of an ESD protection device through the generation of a higher voltage by a voltage pump during the earlier period of an ESD transient, such as the positive voltage stress applied across an IC pin (Input, I/O or VDD pin) and the VSS pin. The higher voltage generated is then used to trigger the primary ESD protection device during the earlier period of the ESD transient.

In an alternative embodiment, the higher voltage generated is used first to trigger a trigger device which induces triggering of the primary ESD protection device during the earlier period of the ESD transient.

BRIEF DESCRIPTIONS OF THE APPENDED DRAWINGS

Figure 1:
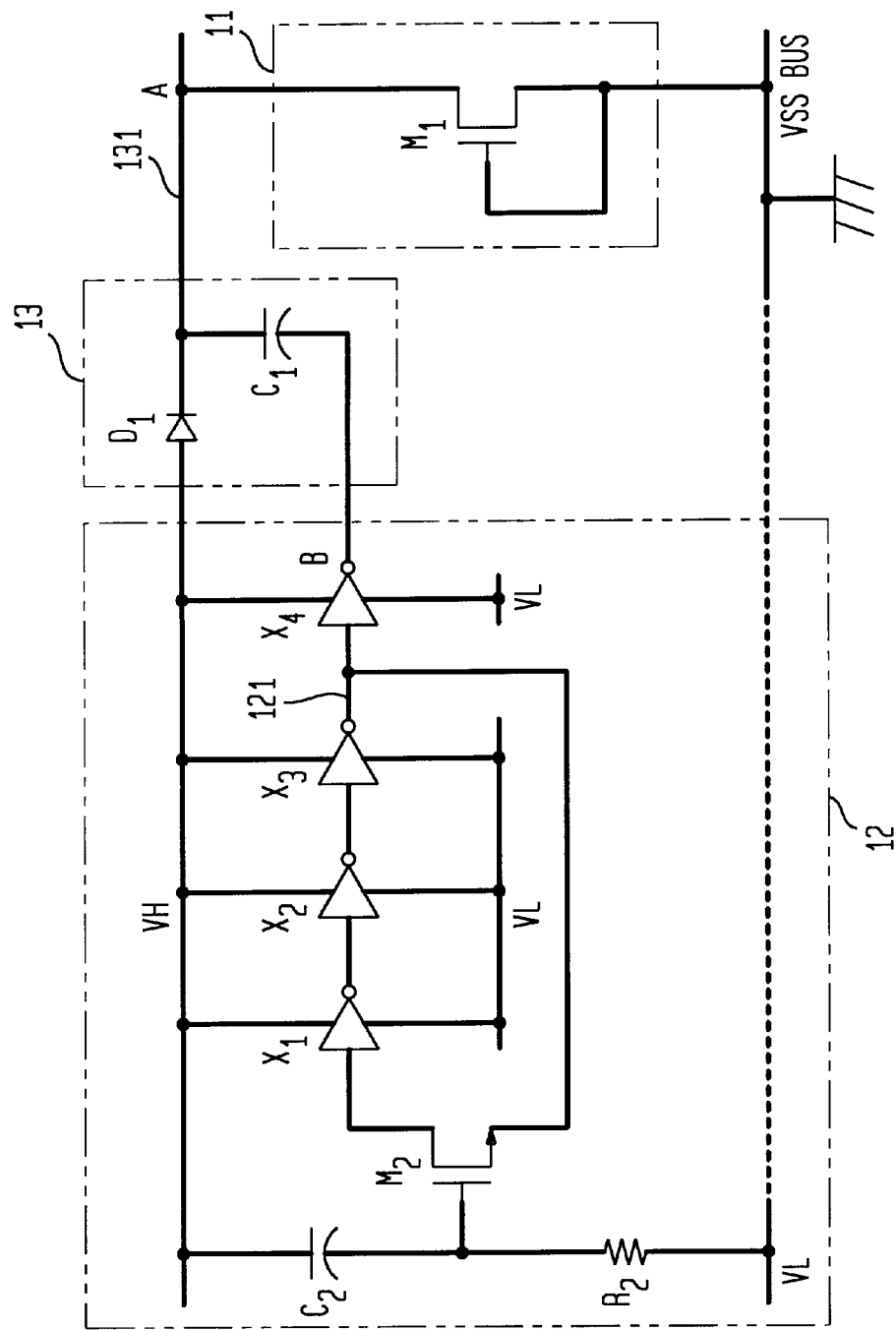
FIG. 1 shows a first preferred embodiment of the invention.
Figure 6:
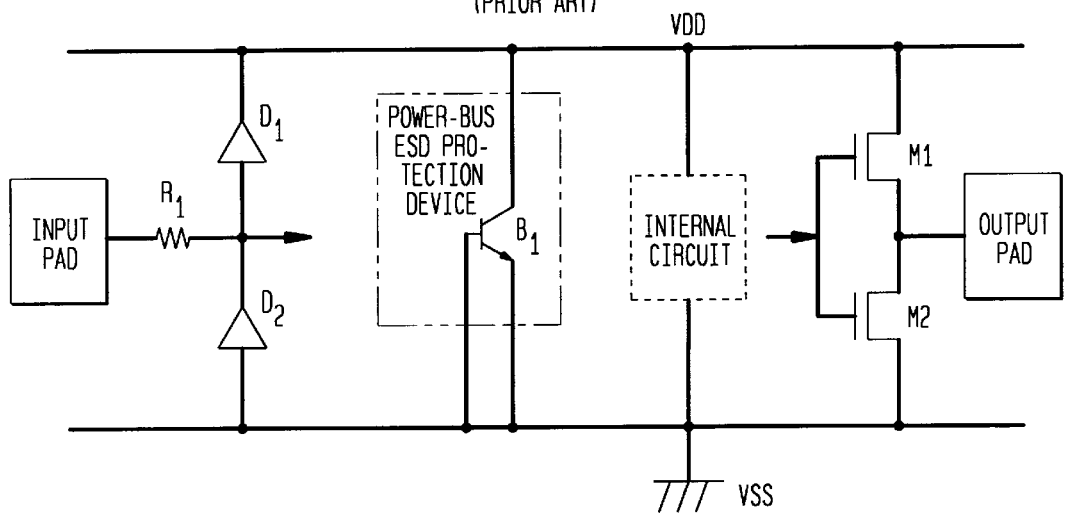

FIG. 6 shows a complete ESD protection scheme according to the prior art shown in FIG. 1 of U.S. Pat. No. 5,751,042.

DETAILED DESCRIPTIONS OF THE PREFERRED EMBODIMENTS

As shown in FIG. 1, the first embodiment of the invention includes an ESD protection circuit 11, an oscillation circuit 12, and a voltage pump 13. The VH of the oscillation circuit 12 is electrically coupled to the VDD bus, or alternatively, electrically coupled to an IC pin via a pull-up device. The VL of the oscillation circuit 12 is electrically coupled to VSS. During a positive VDD-to-VSS or pin-to-VSS ESD event, the voltage difference of the VH and VL applied to the oscillation circuit 12 increases rapidly along with the ESD transient voltage. As a consequence, the amplitude of the oscillating signal 121 also increases rapidly during the initial ESD transient.

In particular, the oscillation circuit 12 is constituted by a ring oscillator which is a serial connection of an odd number of (at least one) inverters. In shown example, inverters X1, X2, X3 are employed. In a preferred embodiment, an optional buffer X4 may be used to improve the drive strength of the oscillating signal 121. The oscillation circuit 12 further includes a delay switch consisting of a switch M2, a capacitor C2 and a resistor R2. The delay switch functions to turn on the oscillation circuit 12 for at least a time period during the ESD event. The delay switch includes a switch M2 having an input node, an output node and a control node, wherein the input node (source) connects to the output terminal of the inverter X3, the output node (drain) connects to an input terminal of the inverter X1. The delay switch includes an RC circuit which has a resistor R2 and a capacitor C2 with one common joint terminal connected to the control node of the switch M2. The control node of M2 is coupled to VH through the capacitor C2, and coupled to VL through the resistor R2. Among other choices, the R-C time constant may be roughly 20 ns, which enables the oscillator circuit 12 to oscillate for at least around 10 ns, but not much longer than 100 ns, during an ESD transient. Since a powering-up event typically takes longer, or much longer, than micro-seconds, the control gate of M2 remains at a much lower voltage than the threshold voltage required to turn on M2. Therefore, the oscillator circuit 12 does not oscillate during normal IC operation or during powering up. The oscillation circuit mentioned above functions only during an ESD event, but not during normal operation nor powering up. This is important for power-saving reason as well as to avoid unwanted triggering of ESD protection circuits during normal IC operation.

During an ESD event, the output terminal of the oscillation circuit 12 generates an oscillation signal 121. The voltage pump 13 pumps the oscillation signal 121 and generates higher voltage pulses 131 at node A during the ESD event.

The voltage pump 13 includes a capacitor C1 and a voltage claming device D1. The capacitor C1 is used to couple the oscillating signal 121 to the voltage-clamping device D1 as shown. The output signal 131 is therefore clamped to a value of (VH–0.8 v) during the downward transition of the oscillating signal 121. Due to the pumping effect offered by the capacitor C1, the voltage signal 131 goes to a value of (VH+V(B)) during the upward transition of the oscillating signal 121. Due to the arrangement of the first embodiment, the voltage value at node A can be as high as 13 volts when the ESD transient voltage on VH line is still less than 10 volts. A voltage having a value of around 13 volts will trigger the primary ESD protection device M1 earlier in an ESD event. Therefore, the ESD protection element as well as the internal circuitry of the integrated circuit can be better protected. For the present invention, neither additional implant nor process complexity is required.

Figure 4:
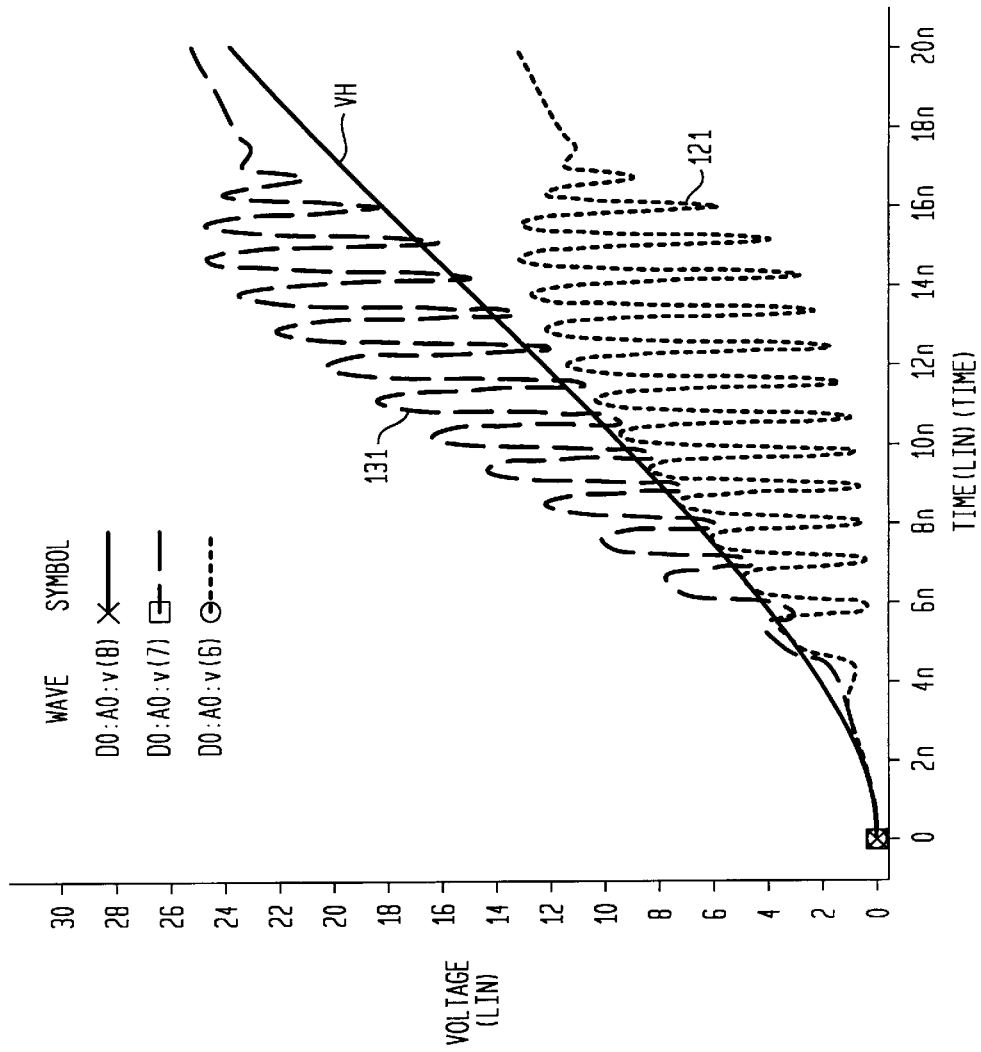
FIG. 4 shows signal variation at respective nodes of the first embodiment of the invention during an ESD event.

FIG. 4 shows signal variation at respective nodes of the first embodiment of the invention during an ESD event. The simulation results are obtained under conditions of (1) 2.5 KV Human Body Model ESD events; (2) 1 nanofarad chip capacitance; (3) R2C2=20 nanoseconds, C2=2 pF, R2=10 KΩ; (4) C1=0.2 pF. As shown in FIG. 4, during the ESD transient, signal 121 oscillates with an increasing amplitude as VDD-to-VSS voltage rises rapidly. The signal 131 also oscillates but pinned at roughly (VH–0.8 V) due to the diode $D_1$ during downward transition of the oscillating signal 121. The arrangement of pull-up devices may be found in FIG. 2 of U.S. Pat. No. 5,345,357 in which the device 201 is a pull-up transistor and the device 202 is a pull-down transistor. FIG. 6 shows a complete ESD scheme which employs a diode type pull-up device D1 and a pull-up MOS transistor M1 according to the prior art shown in FIG. 1 of U.S. Pat. No. 5,751,042.

It is to be noted that, in another embodiment, M2 can be a PMOSFET with the gate coupled to VH through a resistor and coupled to VL through a capacitor.

Figure 2:
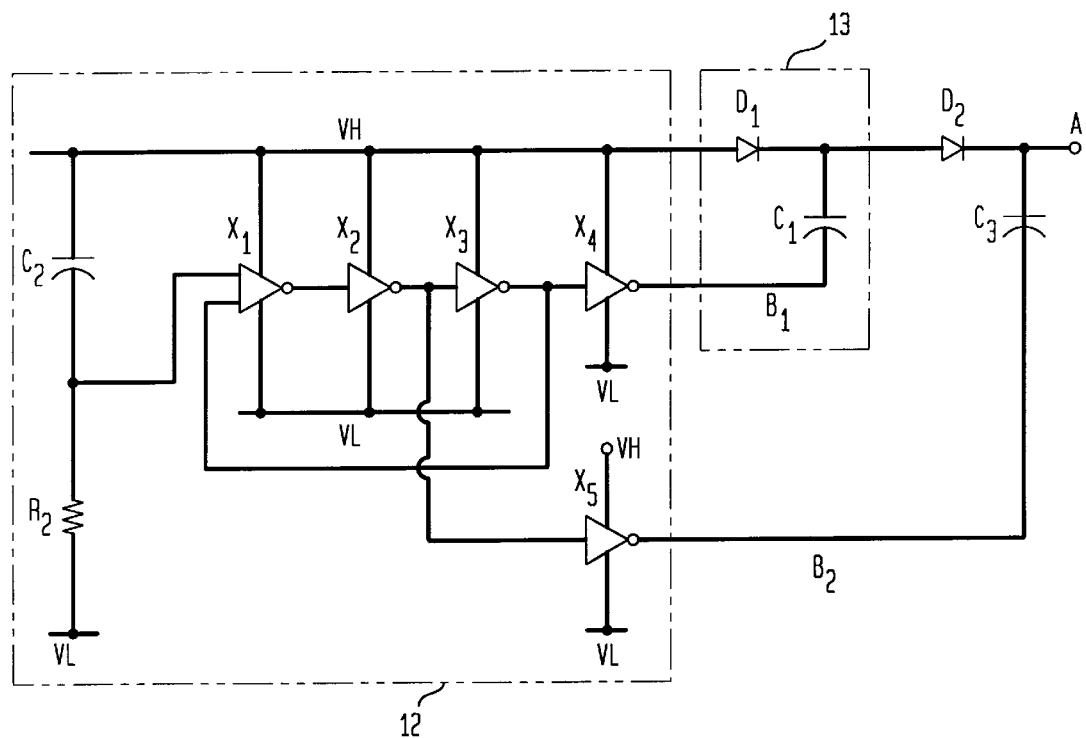
FIG. 2 shows a second preferred embodiment of the invention.

In a second embodiment of the invention shown in FIG. 2, the oscillation circuit 12 includes a NAND gate X1, even number of inverters and an RC circuit. In shown embodiment, two inverters X2, X3 are used. In alternative embodiment, one AND gate is used to equivalently replace X1 and X2. The NAND gate X1 has a first input terminal, a second input terminal and an output terminal. In a general case, N inverters are serially connected to each other, wherein N is an even number, and an output terminal of the last one of the N inverters connects to the first terminal of the NAND gate X1. An input terminal of the first one of the N inverters connects to the output terminal of the NAND gate X1. The RC circuit has a resistor R2 and a capacitor C2 with one common joint terminal connected to the second input terminal of the NAND gate X1 for generating a control signal to terminate the oscillation signal 121 after a time period. In other words, the second input of the NAND gate X1 is coupled to the VH through the capacitor C2 and coupled to the VL through the resistor R2. Same as embodiment shown in FIG. 1, the oscillation circuit 12 of this embodiment functions only during an ESD event, but not during normal operation nor powering up.

In the second embodiment shown in FIG. 2, the invention, in addition to the first voltage pump 13, further includes a second voltage pump which consists of a buffer X5, a capacitor C3 and a voltage clamping device D2. It is clear that the voltage value at node A is substantially equal to VH+V(B1)+V(B2). The input of the buffer X5 is coupled to the output of X2. Therefore, as the V(B1) signal goes downward, the V(B2) goes upward, and vice versa. As a result, the voltage value appearing at node A of FIG. 2 will be higher than that at node A of FIG. 1. The voltage clamping device may, alternatively, be a well known diode-configured MOSFET, such as one denoted as D1 in FIG. 2A of U.S. Pat. No. 5,625,544.

Figure 3:
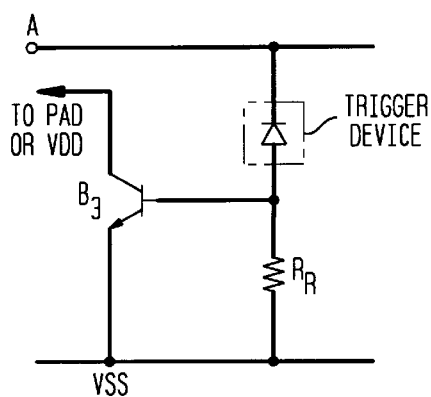
FIG. 3 shows a third preferred embodiment of the invention.

The higher voltage signal generated by the voltage pump of the invention may be applied to the primary ESD protection device as recited above and a trigger device as shown in FIG. 3.

In FIG. 3, node A is the node receiving the higher voltage either from node A of FIG. 1 or 2. The ESD protection device B3 is used to protect an input pin or a power bus during an ESD event. In other words, this embodiment is applicable for pin-to-Vss or Vdd-to-Vss ESD event. The RB represents the substrate (pwell) resistance. It is shown that the trigger device, i.e. a diode in FIG. 3, is used to induce turn-on of the ESD protection device B3. The higher voltage signal 131 outputting from either FIG. 1 or FIG. 2 and appearing at node A first triggers the trigger device such that avalanche break-down occurs. The carriers generated by the trigger device then flow into the substrate to induce the triggering of the ESD protection device B3. Therefore, the spirit of the invention is applicable to the environment shown in FIG. 3.

Figure 5:
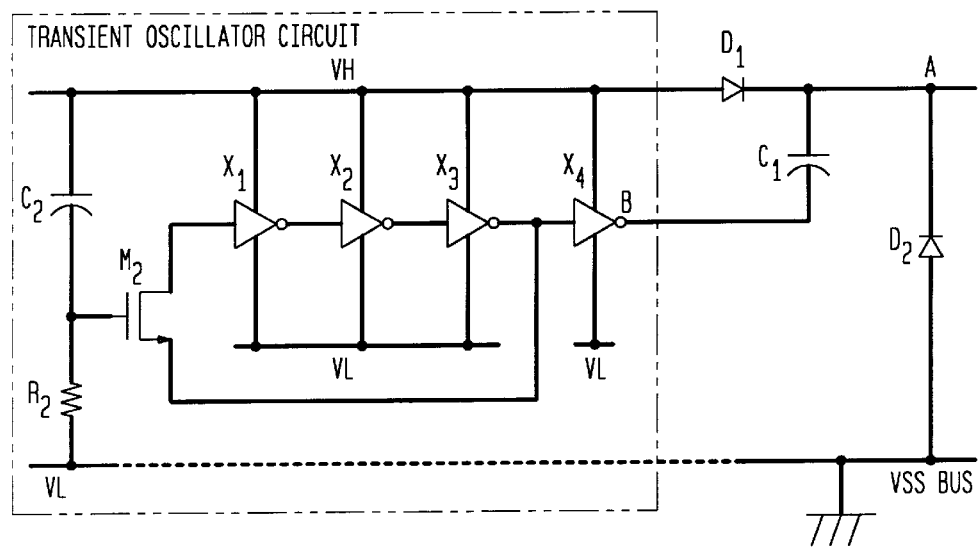
FIG. 5 shows the invention when a diode is used as the ESD protection device

Alternatively, the primary ESD protection device can be any ESD protection device that has a reverse-biased diffusion-substrate junction in an ESD event. Alternatively, a transient switch circuit may substitute the oscillation circuit aforementioned. In the transient switch circuit, the output signal thereof decreases initially and correspondingly with the ESD event and then increases sharply at a switch point. The voltage pump then pumps the output signal, which has above described character, of the transient switch circuit to generate a voltage pulse the magnitude of which is larger than the ESD transient voltage during the ESD event. It will be appreciated by those skilled in the art that the MOSFET 11 in FIG. 1 is only one example of an ESD protection device. In other words, MOSFET 11 can be replaced by other ESD protection device. As described in "ESD in Silicon Integrated Circuits" by A. Amerasekera and C. Duvvury, John Wiley & Sons, 1995, an ESD protection device can be a diode, a thick field device, an SCR, a MOSFET, a bipolar transistor, or the combination thereof. For example, FIG. 5 shows the invention using a diode as the ESD protection device.

I claim:

1. An electrostatic discharge (ESD) protection structure for an integrated circuit constructed on a substrate, comprising:

an ESD protection means constructed on the substrate;

a high voltage generator having an output terminal for generating at least a high voltage pulse in response to an ESD transient voltage during an ESD event, said high voltage pulse having a voltage magnitude larger than the ESD transient voltage;

wherein the output terminal of the high voltage generator is electrically coupled to the ESD protection means such that the high voltage pulse triggers the turn-on of the ESD protection means.

2. The structure of claim 1, wherein the high voltage generator comprises:

a voltage pump having an input terminal and an output 20 terminal, wherein the voltage pump, responsive to the ESD transient voltage, generates the high voltage pulse at the output terminal during the ESD event.

3. The structure of claim 2, wherein the high voltage generator comprises an oscillation means having an output terminal for generating an oscillation signal during the ESD event, and wherein the input terminal of the voltage pump electrically couples to the oscillation means for pumping the oscillation signal to generate the high voltage pulse during the ESD event.

4. The structure of claim 3, wherein the oscillation means comprises:

N inverters serially connected to each other to form a ring oscillator, wherein N is an odd number.

5. The structure of claim 4, wherein the oscillation means further comprises a buffer which has an input and an output, the input of the buffer couples to an output terminal of a last one of said N inverters, the output of the buffer defines the output terminal of the oscillation means, said buffer boosts the driving strength of the oscillation signal during the ESD event.

6. The structure of claim 2, wherein the voltage pump comprises:

a capacitive means having a first terminal defining the input terminal of the voltage pump, and having a second terminal defining the output terminal of the voltage pump;

a voltage clamping means coupled between said output terminal of the voltage pump and a bus receiving the ESD transient voltage.

7. The structure of claim 3, further comprising a delay-switch means operative to turn on the oscillation means for at least a time period during the ESD event.

8. The structure of claim 7, wherein the oscillation means comprises:

N inverters serially connected to each other, N is odd number, a last one of the N inverters generates the oscillation signal at an output terminal thereof.

9. The structure of claim 8, wherein the delay-switch means comprises:

a switch means having an input node, an output node and a control node, wherein said input node connects to the output terminal of the last one of N inverters, said output node connects to an input terminal of a first one of N inverters;

a control signal generator for generating a control signal to said control node of the switch means to turn on the switch means for at least a time period during the ESD event.

10. The structure of claim 9, wherein said control signal keeps said switch means off during normal operation of the integrated circuit.

11. The structure of claim 9, wherein said control signal keeps said switch means off during power-on operation of the integrated circuit.

12. The structure of claim 9, wherein said control signal generator includes an RC circuit having a resistor and a capacitor with one common joint terminal generating the control signal, the common joint terminal is connected to said control node.

13. The structure of claim 9, wherein said switch means is a MOSFET transistor, and said control node is the gate of the MOSFET transistor.

14. The structure of claim 3, wherein the oscillation means comprises:

a logic gate having a first input terminal, a second input terminal and an output terminal;

N inverters serially connected to each other, N being an even number, wherein an output terminal of a last one of the N inverters connects to the first input terminal of the logic gate, an input terminal of a first one of the N inverters connects to the output terminal of the logic gate;

a control signal generator for generating a control signal to said second input terminal of the logic gate, the control signal selectively enables the switching of said logic gate for at least a time period during the ESD event.

15. The structure of claim 14, wherein the logic gate is a NAND gate.

16. The structure of claim 14, wherein the control signal selectively keeps said logic gate in a non-switching state during normal operation of the integrated circuit.

17. The structure of claim 14, wherein the control signal selectively keeps said logic gate in a non-switching state during power-on operation of the integrated circuit.

18. The structure of claim 14, wherein said control signal generator includes:

an RC circuit having a resistor and a capacitor with one common joint terminal generating said control signal.

19. The structure of claim 6, wherein said voltage clamping means is a diode.

20. The structure of claim 6, wherein said voltage clamping means is a diode-configured MOSFET.

21. The structure of claim 1, wherein the ESD protection means is a bipolar transistor.

22. The structure of claim 1, wherein the ESD protection means is a MOSFET transistor.

23. The structure of claim 1, wherein the ESD protection means is a diode.

24. The structure of claim 1, wherein, during the ESD event, an ESD voltage is applied between a VDD pin and a VSS pin.

25. The structure of claim 1, wherein, during the ESD event, an ESD voltage is applied between an IC pin and a power-bus pin.

26. The structure of claim 25, wherein said power-bus pin is a VSS bus pin, a VDD power line is connected to said IC pin via a pull up means, said oscillation means is powered by the VDD and VSS.

27. The structure of claim 26, wherein said pull up means is a diode.

28. The structure of claim 26, wherein said pull up means is a PMOSFET.

29. The structure of claim 2, further comprising:

a second voltage pump, having an output terminal, for pumping the high voltage pulse to generate another high voltage pulse at the output terminal during the ESD event, said another high voltage pulse having a voltage magnitude larger than the high voltage pulse, wherein the output terminal of the second voltage pump electrically couples to the ESD means for triggering the turn-on of the ESD protection means.

30. An electrostatic discharge (ESD) protection structure for an integrated circuit constructed on a substrate, comprising:

a trigger device;

an ESD protection means constructed on the substrate and adjacent to the trigger device;

a high voltage generator for generating at least a high voltage pulse in response to an ESD transient voltage during an ESD event, said high voltage pulse having a voltage magnitude larger than the ESD transient voltage;

wherein the output terminal of the high voltage generator electrically couples to the trigger device such that the high voltage pulse causes the breakdown of the trigger device for triggering the turn-on of the ESD protection means.

31. The structure of claim 30, wherein the high voltage generator comprises:

a voltage pump having an input terminal and an output terminal, the voltage pump, responsive to the ESD transient voltage, generates the high voltage pulse at the output terminal during the ESD event.

32. The structure of claim 31, wherein the high voltage generator comprises an oscillation means having an output terminal for generating an oscillation signal during the ESD event, and wherein the input terminal of said voltage pump electrically couples to the oscillation means for pumping the oscillation signal to generate the high voltage pulse during the ESD event.

33. A method for triggering an electrostatic discharge (ESD) protection circuit for an integrated circuit constructed on a substrate, the ESD protection circuit including an ESD protection means constructed on the substrate, comprising the following steps:

generating an oscillation signal in response to an ESD transient voltage during an ESD event;

pumping the oscillation signal to generate at least a high voltage pulse having a voltage magnitude larger than the ESD transient voltage;

applying said high voltage pulse to trigger the turn-on of the ESD protection means.

34. A method for triggering an electrostatic discharge (ESD) protection circuit for an integrated circuit constructed on a substrate, the ESD protection circuit including an ESD protection means constructed on the substrate and a trigger device adjacent to the ESD protection means, comprising the following steps:

generating an oscillation signal in response to an ESD transient voltage during an ESD event;

pumping the oscillation signal to generate at least a high voltage pulse having a voltage magnitude larger than the ESD transient voltage;

applying said high voltage pulse to trigger the trigger device to induce the turn-on of the ESD protection means.

35. An electrostatic discharge (ESD) protection structure for an integrated circuit constructed on a substrate, comprising:

an ESD protection means constructed on the substrate;

a high voltage generator, having an input terminal and an output terminal, for generating a second high voltage pulse at said output terminal, responsive to a first voltage signal at the input terminal, during an ESD event, the second high voltage pulse having a magnitude larger than said first voltage signal, said output terminal being coupled to said ESD protection means;

wherein the second high voltage pulse triggers turn-on of the ESD protection means to conduct a large current due to the ESD event.

36. The structure of claim 35, wherein the high voltage generator comprises:

a voltage pump having an input terminal and an output terminal, the voltage pump, responsive to the ESD transient voltage, generates the second high voltage pulse at the output terminal during the ESD event.

37. The structure of claim 35, wherein the high voltage generator comprises:

an oscillation means having an output terminal for generating an oscillation signal during the ESD event;

a voltage pump for pumping the oscillation signal to generate the second high voltage pulse during the ESD event.

38. The structure of claim 36, wherein the voltage pump comprises:

a capacitive means having a first terminal defining the input terminal of the voltage pump, and having a second terminal defining the output terminal of the voltage pump;

a voltage clamping means coupled between said output terminal of the voltage pump and a bus receiving the ESD transient voltage.

* * * * *